R. E. HELLMUND.
CONTROL SYSTEM.
APPLICATION FILED JAN. 5, 1918.
1,312,786.
Patented Aug. 12, 1919.
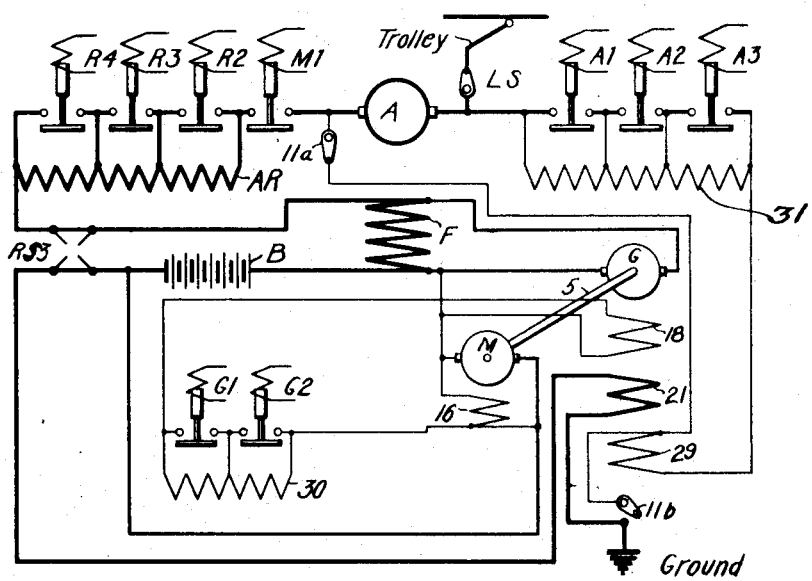
Fig. 1
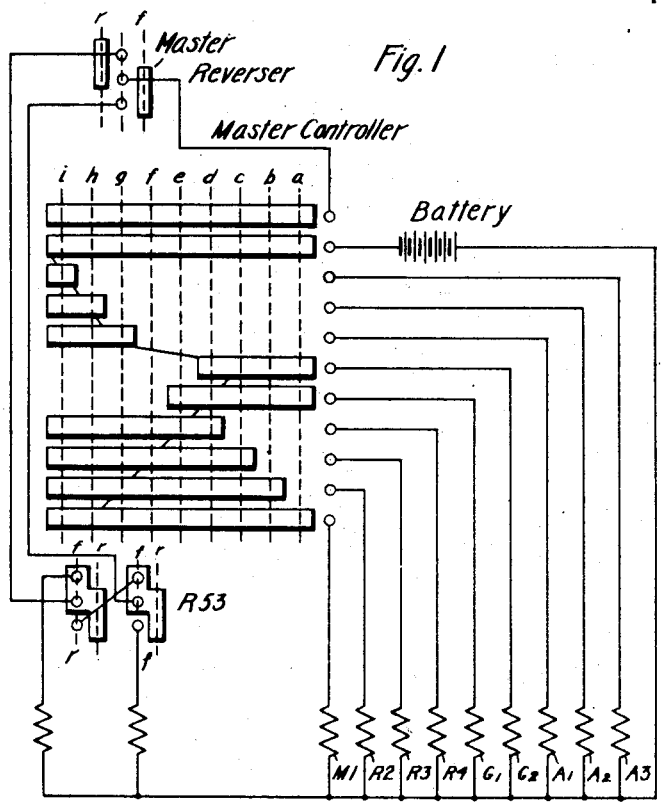
Fig. 2
Fig. 3
WITNESSES:
J. C. Rodgers
W. R. Coley
INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,312,786.  Specification of Letters Patent.  Patented Aug. 12, 1919.

Original application filed September 25, 1914, Serial No. 863,504. Divided and application filed November 7, 1917, Serial No. 200,656. Divided and this application filed January 5, 1918. Serial No. 210,527.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Systems, of which the following is a specification, this application being a division of my copending application, Serial No. 200,656, filed November 7, 1917, which is a division of application Serial No. 863,504, filed September 25, 1914, patented Dec. 11, 1917, No. 1,249,954.

My invention relates to systems of control, and it has special reference to means for preventing the occurrence of "flash-over" conditions in dynamo-electric machines, more particularly electric railway motors, under predetermined conditions.

One object of my invention is to provide simple and reliable means of the above-indicated character which shall effectively obviate the possibility of "flash-over" of electric motors upon the resumption of supply-circuit voltage after a temporary interruption thereof, such as is caused by the trolley wheel or other current-collecting member passing under a section break or otherwise momentarily leaving the supply-circuit conductor.

More particularly, in high-voltage direct current systems and in the case of locomotives of large capacity, it may be advisable, for economical and other reasons, to provide means for preventing "flash-over" of the motor, the most common cause of which is the sudden resumption of supply-circuit energy after the temporary interruption thereof at section breaks, etc. Whenever the supply of energy is resumed, a heavy rush of current through the deënergized motor windings occurs, which causes great field-flux distortion and relatively high voltage between commutator segments. This condition arises by reason of the fact that the flux set up by the armature current, upon resumption of supply-circuit energy, readily traverses the entirely laminated armature core, and, consequently, builds up to a normal value much more rapidly than the main field flux which encounters the high magnetic reluctance of the solid iron or steel frame castings and which is, therefore, partly damped out by eddy currents.

According to my present invention, I provide means for obviating the above-mentioned operating difficulties by energizing the main field winding from some auxiliary source of energy when the supply-circuit energy is temporarily interrupted. The main field flux is thus maintained at a predetermined value during the interruption and, as a result, when the supply-circuit energy is resumed, the predominance of armature ampere-turns over field ampere-turns is prevented, and "flash-over" conditions do not obtain.

In the accompanying drawing, Figure 1 is a diagrammatic view of the main circuits of a system of control embodying the invention; and Fig. 2 is a diagrammatic view of an auxiliary control system for governing the main-circuit connections of Fig. 1, in accordance with the sequence chart of well-known form that is shown in Fig. 3.

Referring to Fig. 1 of the drawing, the system shown comprises a supply-circuit conductor marked "Trolley", a return circuit conductor marked "Ground", an electric motor having an armature A and a field magnet winding F of the series type; an auxiliary motor-generator set comprising a motor M that is driven from a battery B in the main circuit, and a generator G that is connected to energize the main field winding F; an accelerating resistor AR, the sections of which are respectively adapted to be short-circuited by switches R2, R3 and R4, which are preferably of a familiar electro-magnetically actuated type; main-circuit switches LS and M1; and a reversing switch RS3 for the armature A with respect to the field winding F and the motor-generator set and battery.

The motor M is provided with a shunt field winding 16, while the generator G is provided with three field windings 18, 21 and 29. The separately excited field winding 18 is connected in series with a resistor 30, the sections of which are respectively adapted to be short-circuited by switches G1 and G2; the series field winding 21 is connected in series-circuit relation with the main motor; and the field winding 29 is adapted to act differentially to the other two and is connected across the main armature A in series with a resistor 31, the sections of which are respectively adapted to be short-circuited by switches A1, A2 and A3. All of the switches shown, with the exception of the switch LS, are preferably of a simple and familiar electromagnetically operated type, the actuating coils of which are adapted to be energized by the auxiliary control system shown in Fig. 2, in accordance with the sequence chart of Fig. 3.

The acceleration of the motor may be effected by initially closing switches LS, M1, G1 and G2, then gradually and successively closing the resistor-short-circuiting switches R2, R3 and R4; further acceleration may be secured by successively opening switches G1 and G2 to weaken the separately excited field winding 18, and closing switches A1, A2 and A3 to strengthen the armature-excited, differentially-connected field winding 29, thereby in each case serving to further weaken the current in the main field winding F to increase the main motor speed. The auxiliary control system illustrated in Fig. 2 is of a simple and familiar type that is adapted to actuate the several circuit switches as just described and, as indicated in the chart of Fig. 3, and, inasmuch as the particular system employed for arranging the circuit connections of the system shown in Fig. 2 is not material to my present invention, I have not deemed it necessary to describe the auxiliary control system in detail.

Assuming the motor to be running in its final operating condition, and that the actions of the generator field windings 18 and 29 are then exactly equal and opposite, so that the field winding 21 is alone active, the operation of the system with respect to the prevention of "flash-over" conditions may be described as follows: by reason of the neutralization of the generator field windings 18 and 29, the main motor will run with a straight series speed characteristic. Upon the interruption of supply-circuit energy, the main motor field excitation and the main armature voltage tend to decrease to zero. Consequently, the excitation of the armature-excited field winding 29 decreases, with the result that the separately excited field winding 18 exerts an active influence to produce a positive magnetization of the generator G, and, therefore, of the main field winding F to a predetermined extent which will obviate an excessive rush of current when the supply-circuit energy is resumed.

The system shown has the further advantage of producing relatively steep speed characteristic curves, during acceleration. Since the generator field winding 29 is excited from the main armature A, the voltage impressed upon the field winding will increase as the main-circuit resistor is gradually short-circuited, thereby effecting an automatic decrease of the current supplied by the generator G to the main field winding F as the main motor accelerates, by reason of the differential action of the field winding 29. It will be understood that relatively steep accelerating characteristic curves signify a relatively small number of requisite accelerating positions of a motor-controller. As a modification of the system, the generator field winding 29 may be connected across the supply circuit, by opening a switch 11$^a$ and closing a switch 11$^b$, in which case, the type of characteristic curves referred to would not, of course, be obtained.

I do not wish to be restricted to the specific circuit connections or arrangement of parts herein set forth, as various modifications may be made within the spirit and scope of my invention. I desire, therefore, that only such limitations shall be imposed as are indicated in the appended claims.

I claim as my invention:

1. In a system of control, the combination with a supply circuit and a main dynamo-electric machine operated therefrom and having an armature and a field winding, of an auxiliary machine for exciting said field winding, and means for energizing said auxiliary machine to provide the main machine with a series speed characteristic as soon as stable conditions obtain upon reestablishment of supply-circuit energization after an interruption thereof, and means substantially fully active only during such interruption for replacing the normal excitation of said auxiliary machine.

2. In a system of control, the combination with a supply circuit and a main dynamo-electric machine operated therefrom and having an armature and a field winding, of an auxiliary machine for exciting said field winding, means for influencing said auxiliary machine in accordance with main-machine current as soon as stable conditions obtain upon reestablishment of supply-circuit energization after an interruption thereof, and means for inherently adjusting the separate excitation of said auxiliary machine and for compensating for the inaction of the first means during such interruption.

3. In a system of control, the combination with a supply circuit and a main dynamo-electric machine operated therefrom and having an armature and a field winding, of an auxiliary machine for exciting said field winding, and means for inherently energizing said auxiliary machine to increase the separate excitation thereof during interruption of supply-circuit energization and to provide excitation in accordance with main-machine current as soon as stable conditions obtain upon the reestablishment of said energization.

4. In a system of control, the combination with a supply circuit and a main dynamo-electro machine having an armature and a field winding, of an auxiliary machine for exciting said field winding, and means for influencing said auxiliary machine in accordance with main machine current during certain normal operation, with an inherently increasing separate excitation during interruption of supply-circuit energization and again with main-machine current as soon as stable conditions obtain upon the reëstablishment of said energization.

5. In a system of control, the combination with a supply circuit and a main dynamo-electric machine having an armature and a field winding, of an auxiliary armature for exciting said field winding, a source of energy independent of said supply circuit, a plurality of differentially-related field windings for said exciting armature respectively energized in accordance with main-armature voltage and with the voltage of said source of energy, a third field winding for the exciting armature energized in accordance with main-armature current, and a driving motor for the exciting armature connected to said source of energy.

6. In a system of control, the combination with a supply circuit and a main dynamo-electric machine having an armature and a field winding, of an auxiliary armature for exciting said field winding, a source of energy independent of said supply circuit, a plurality of differentially-related field windings for said exciting armature respectively energized in accordance with main-armature voltage and with the voltage of said source of energy, a third field winding for the exciting armature energized in accordance with main-armature current, and connected to assist the armature-voltage-excited field winding, and a driving motor for the exciting armature fed from said source of energy.

7. In a system of control, the combination with a supply circuit and a main dynamo-electric machine having an armature and a field winding, of an auxiliary armature for exciting said field winding, and means including a field winding and a source of energy for inherently increasing the excitation of said auxiliary armature when the main-machine voltage is materially smaller than the supply-circuit voltage.

8. In a system of control, the combination with a supply circuit and a main dynamo-electric machine having an armature and a field winding, of an auxiliary armature for exciting said field winding, a field winding for said auxiliary armature energized in accordance with the main-armature voltage, and a second field winding differentially connected to increase the auxiliary-armature voltage when the main-machine voltage is materially smaller than the supply-circuit voltage.

9. In a system of control, the combination with a supply circuit and a main dynamo-electric machine operating therefrom and having an armature and a field winding, of an auxiliary armature for exciting said field winding, a field winding for said auxiliary winding, a field winding for said auxiliary armature connected across the main armature, and a second field winding independently energized and differentially connected to inherently effect an increase of the main-armature field flux during an interruption of supply-circuit energization of the main machine.

10. In a system of control, the combination with a supply circuit and a main dynamo-electric machine operating therefrom and having an armature and a field winding, of an auxiliary armature for exciting said field winding, an auxiliary source of energy, a field winding for said auxiliary armature connected across the main armature, a second field winding energized from said auxiliary source and differentially connected to inherently effect an increase of the auxiliary-armature voltage during an interruption of supply-circuit energization of the main machine, and a driving motor for said auxiliary armature fed from said source.

11. In a system of control, the combination with a supply circuit and a main dynamo-electric machine operating therefrom and having an armature and a series-connected field winding, of an auxiliary machine for supplying the difference between the total necessary exciting current and the main load current to said field winding, said auxiliary machine being energized in accordance with main-armature current and also with a separate excitation, and means for modifying the separate excitation upon supply-circuit deënergization.

12. In a system of control, the combination with a supply circuit and a main dynamo-electric machine operated therefrom and having an armature and a field winding, of an auxiliary armature for exciting said field winding, means for energizing said auxiliary armature to modify the separate excitation thereof during interruption of supply-circuit energization, and means for assisting the action of the first means during the establishment of stable conditions upon the resumption of said energization.

In testimony whereof I have hereunto subscribed my name this 22nd day of Dec., 1917.

RUDOLF E. HELLMUND.